United States Patent
Smith

(10) Patent No.: US 11,884,431 B2
(45) Date of Patent: *Jan. 30, 2024

(54) CHASSIS FOR AEROSOL DISPENSER AEROSOL DISPENSER HAVING A CHASSIS AND PREFORM CHASSIS FOR AN AEROSOL DISPENSER

(71) Applicant: The Procter & Gamble Company, Cincinnati, OH (US)

(72) Inventor: Scott Edward Smith, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,265

(22) Filed: Apr. 22, 2021

(65) Prior Publication Data

US 2021/0237919 A1 Aug. 5, 2021

Related U.S. Application Data

(63) Continuation of application No. 16/708,952, filed on Dec. 10, 2019, now Pat. No. 11,014,699, which is a
(Continued)

(30) Foreign Application Priority Data

May 16, 2017 (EP) ..................................... 17171420

(51) Int. Cl.
*B65B 31/00* (2006.01)
*B65D 83/38* (2006.01)
(Continued)

(52) U.S. Cl.
CPC ........ *B65B 31/003* (2013.01); *B29C 65/0672* (2013.01); *B65B 61/186* (2013.01);
(Continued)

(58) Field of Classification Search
CPC ..... B65B 31/003; B65B 61/186; B65D 83/48; B65D 83/62; B65D 83/38; B65D 1/023; B29C 65/0672

See application file for complete search history.

(56) References Cited

U.S. PATENT DOCUMENTS 2,863,699 A * 12/1958 Elser ...................... B65D 83/48
222/402.24
3,333,743 A 8/1967 Meyers
(Continued)

FOREIGN PATENT DOCUMENTS

GB 1101134 A 1/1968
JP 2012111549 A * 6/2012
(Continued)

OTHER PUBLICATIONS

Machine Translation of JP-2012111549-A from opo.org.*
(Continued)

*Primary Examiner* — Jeremy Carroll
(74) *Attorney, Agent, or Firm* — William E. Gallagher; Sarah M. Decristofaro

(57) ABSTRACT

An aerosol dispenser, outer container for an aerosol dispenser and a preform for an outer container, each include an open neck at the top and a closed end bottom. The open neck may include a first surface having a first surface diameter, a second surface disposed interior to the first surface and having a second surface diameter less than the first surface diameter, and a transition distinguishing the first surface from the second surface. For a dispenser and a container, a product delivery device may be disposed on the second surface and not interfere with a valve operable by a user when the valve is attached to the open neck in engagement with the first surface. At least one of the first and the second surfaces may be a sealing surface to prevent escape of
(Continued)

propellant from the outer container to ambient when a valve is attached.

5 Claims, 14 Drawing Sheets

Related U.S. Application Data continuation of application No. 15/972,267, filed on May 7, 2018, now Pat. No. 10,538,351.

(51) Int. Cl.
*B65D 83/48* (2006.01)
*B29C 65/06* (2006.01)
*B65B 61/18* (2006.01)
*B65D 1/02* (2006.01)
B65D 83/40 (2006.01)
B65D 83/62 (2006.01)
B29L 31/00 (2006.01)
B65D 83/32 (2006.01)

(52) U.S. Cl.
CPC ............ *B65D 83/38* (2013.01); *B65D 83/48* (2013.01); *B29L 2031/712* (2013.01); *B65D 1/023* (2013.01); *B65D 83/32* (2013.01); *B65D 83/384* (2013.01); *B65D 83/40* (2013.01); *B65D 83/62* (2013.01)

(56) References Cited

U.S. PATENT DOCUMENTS

| | | | |
|---|---|---|---|
| 3,403,804 A | 10/1968 | Colombo | |
| 3,450,254 A | 6/1969 | Miles | |
| RE30,093 E | 9/1979 | Burger | |
| 4,330,066 A | 5/1982 | Berliner | |
| 4,852,807 A * | 8/1989 | Stoody | B65D 83/46 239/576 |
| 4,887,743 A * | 12/1989 | Blake | B65D 83/48 222/402.1 |
| 4,969,577 A | 11/1990 | Werding | |
| 5,450,989 A * | 9/1995 | Gilroy | B65D 83/38 222/402.1 |
| 5,553,753 A * | 9/1996 | Abplanalp | B65D 11/02 222/387 |
| 6,019,252 A | 2/2000 | Benecke et al. | |
| 6,254,820 B1 | 7/2001 | Cornell | |
| 7,028,866 B2 | 4/2006 | Kunesh et al. | |
| 7,279,207 B2 | 10/2007 | Darr | |
| 7,303,087 B2 | 12/2007 | Flashinski et al. | |
| 8,074,847 B2 | 12/2011 | Smith | |
| 8,096,327 B2 | 1/2012 | Hirz | |
| 8,439,223 B2 | 5/2013 | Smith et al. | |
| 8,505,762 B2 | 8/2013 | Holbach et al. | |
| 8,511,522 B2 | 8/2013 | Chan et al. | |
| 8,631,632 B2 | 1/2014 | Morales et al. | |
| 8,752,731 B2 | 6/2014 | Nimmo et al. | |
| 8,844,765 B2 | 9/2014 | Tryon | |
| 8,869,842 B2 | 10/2014 | Smith | |
| 9,061,795 B2 | 6/2015 | Girardot et al. | |
| 9,132,955 B2 | 9/2015 | Smith et al. | |
| 9,174,229 B2 | 11/2015 | Smith | |
| 9,296,550 B2 | 3/2016 | Smith et al. | |
| 9,334,103 B2 | 5/2016 | Soliman | |
| 9,505,509 B2 | 11/2016 | Smith | |
| 10,538,351 B2 | 1/2020 | Smith | |
| 2003/0102328 A1* | 6/2003 | Abplanalp | B65D 83/48 222/402.1 |
| 2009/0014679 A1* | 1/2009 | Hygema | B65D 83/42 251/368 |
| 2011/0174827 A1* | 7/2011 | Patel | B65D 1/0284 220/636 |
| 2011/0248035 A1 | 10/2011 | Peirsman et al. | |
| 2012/0292338 A1* | 11/2012 | Smith | B65D 83/62 222/95 |
| 2015/0014364 A1* | 1/2015 | Greenfield | B65D 83/62 222/95 |
| 2015/0108387 A1* | 4/2015 | Smith | F16K 1/34 251/333 |
| 2016/0101925 A1* | 4/2016 | Franz | B65D 83/38 222/402.25 |
| 2016/0368700 A1 | 12/2016 | Smith et al. | |
| 2016/0377231 A1* | 12/2016 | Smith | F16K 1/30 251/325 |
| 2017/0129690 A1 | 5/2017 | Sugawara | |
| 2018/0334313 A1 | 11/2018 | Smith | |
| 2019/0315559 A1* | 10/2019 | Magness | B65D 83/38 |
| 2020/0108957 A1 | 4/2020 | Smith | |

FOREIGN PATENT DOCUMENTS

| | | |
|---|---|---|
| JP | 2012111549 A | 6/2012 |
| WO | 9108099 A1 | 6/1991 |

OTHER PUBLICATIONS

EP Search Report dated Aug. 12, 17; Application No. 17171420.7-1760; 10 Pages.
14800 PCT Search Report and Written Opinion for PCT/US2018/032857 dated Aug. 22, 2018, 17 pages.
All Office Actions; U.S. Appl. No. 15/972,267, filed May 7, 2018.
All Office Actions; U.S. Appl. No. 16/708,952, filed Dec. 10, 2019.

* cited by examiner

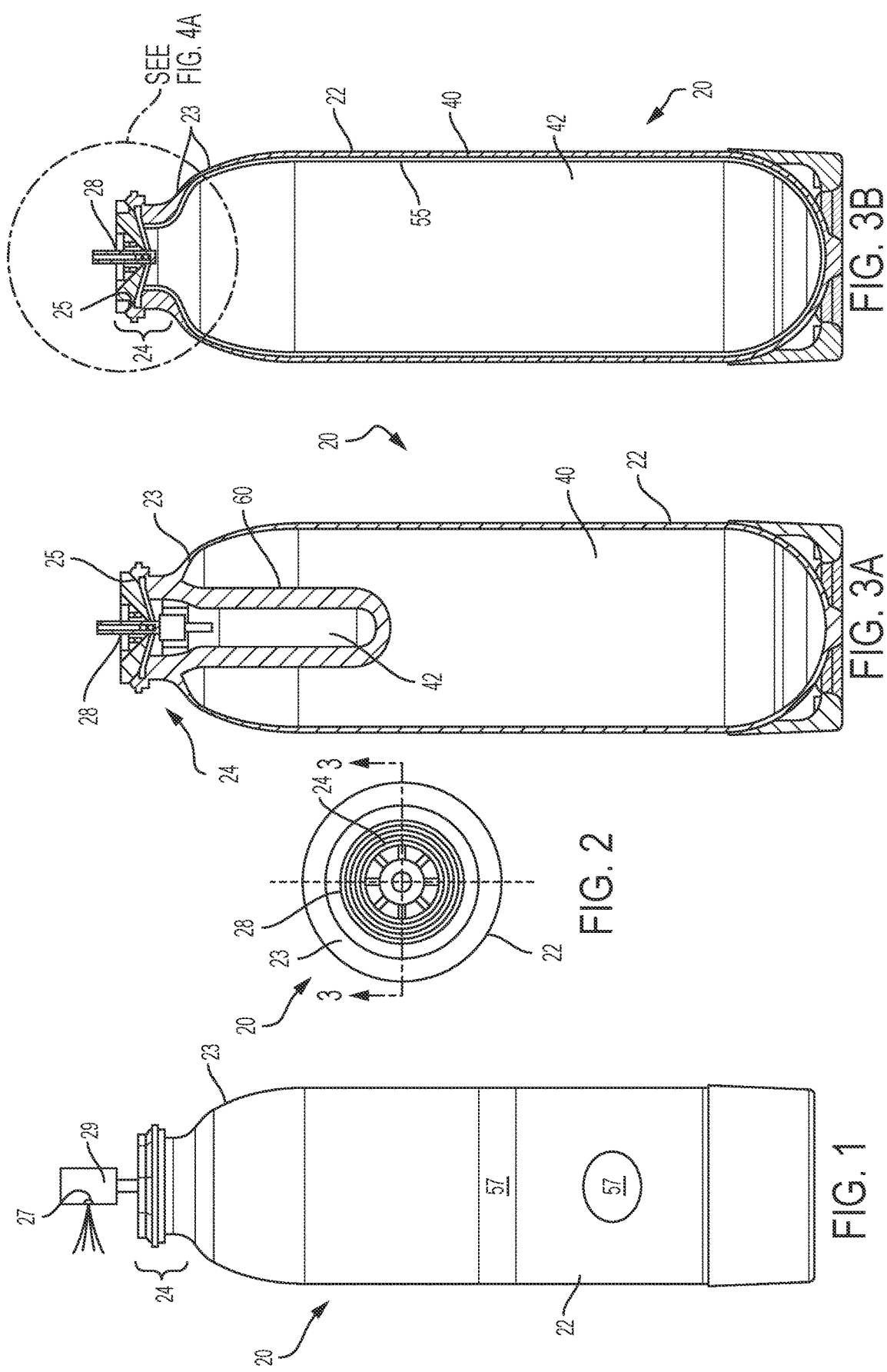

CHASSIS FOR AEROSOL DISPENSER AEROSOL DISPENSER HAVING A CHASSIS AND PREFORM CHASSIS FOR AN AEROSOL DISPENSER

FIELD OF THE INVENTION

The present invention relates to multi-format aerosol dispensers and components for the manufacture thereof.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 4,969,577; 8,752,731; 9,296,550; 9,334,103 and 2009/0014679.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804 or a base cup as shown in commonly assigned U.S. Pat. Nos. 8,439,223 and 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

Typically a valve cup is inserted into the neck. The valve cup is sealed against the neck to prevent the escape of the propellant and loss of pressurization, such as described in U.S. Pat. Nos. 8,074,847; 8,096,327; 8,844,765; 8,869,842 and 9,505,509. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned U.S. Pat. No. 9,174,229.

A valve may be inserted into the valve cup for selective actuation by the user. The valve is typically normally closed, and may be opened to create a flow path for the product to ambient or a target surface. The valve may be compatible with local recycling standards. Suitable valves are disclosed in commonly assigned U.S. Pat. Nos. 8,511,522 and 9,132,955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve 28 and plastic valve cup are used. Suitable interlocks include bayonet fittings and threads as disclosed in commonly assigned P&G Case 14458, Ser. No. 15/235,237, filed Aug. 12, 2016. A pressure vessel with a threaded bore is proposed in U.S. Pat. No. 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned P&G Case 14458, Ser. No. 15/235,227, filed Aug. 12, 2016 which teaches attaching a bag to a valve cup.

If a bag configuration is desired, propellant may be disposed between the bag and outer container, as disclosed in commonly assigned U.S. Pat. Nos. 8,631,632 and 8,869,842. Afterwards, product fill may occur in a separate, remote, operation, optionally carried out in another location, which may be in the same country or in a different country. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned P&G Case 14461, application Ser. No. 15/235,279, filed Aug. 12, 2016.

Alternatively, a dip tub may be used if intermixing of the product and propellant is desired. When the user actuates the valve, the product and propellant are dispensed together through the dip tube. This embodiment may utilize a dip tube. The dip tube takes the product and propellant mixture from the bottom of the outer container. Or a piston may be used to expel product, particularly if highly viscous, as described in commonly assigned 2016/0368700.

Collectively, bags, dip tube, pistons and the associated hardware are referred to as product delivery devices. Various formats for the delivery devices may be required for different products, often complicating production. For example, one product may require a dip tube product delivery device in conjunction with a very small nozzle. The next aerosol dispenser on the production schedule may simply require changeout to a new, larger, nozzle.

But if one wishes to then manufacture an aerosol dispenser utilizing a bag for a particular production cycle, then manufacture an aerosol dispenser having a piston, or go back to a dip tube, for subsequent production cycles, considerable changeout is required. Different outer containers are typically needed to accommodate the different product delivery devices. Likewise, different valves are likely required. As different valves are required, the different outer containers must be matched to accommodate the different valves. A combination of outer container, valve, product delivery device and associated hardware, if any, is referred to as a format for a particular aerosol dispenser.

The numbers of components required for even a few different formats can dramatically increase as different products are produced in respective aerosol dispensers. Such increase dramatically raises production costs and increases the opportunity for mistakes. Accordingly this invention simplifies production of aerosol dispensers when different aerosol dispenser formats are sought.

SUMMARY OF THE INVENTION

In one embodiment the invention comprises an outer container having a longitudinal axis and being usable for a pressurized aerosol dispenser, the outer container comprising:
  a closed end bottom and an open neck longitudinally opposed thereto, the open neck having:
  a valve attachment having a valve attachment diameter,
  a first surface disposed below the valve attachment and having a first surface diameter less than
  the valve attachment diameter, and
  a second surface disposed interior to the first surface and having a second surface diameter less than the first surface diameter,
  whereby a product delivery device complementary to the second surface can be disposed thereon and not interfere with a valve operable by a user when a the valve is attached to the valve attachment in engagement with the first surface, at least one of the first surface and the second surface being a sealing surface to prevent escape of propellant from the outer container to ambient when a valve is attached to the valve attachment.

In one embodiment the invention comprises an aerosol dispenser having a longitudinal axis and comprising:
  an outer container comprising a closed end bottom and an open neck longitudinally opposed thereto, the open neck having
  a valve attachment having a valve attachment diameter,
  a first surface disposed below the valve attachment and having a first surface diameter less than the valve attachment diameter,
  a second surface disposed interior to the first surface and having a second surface diameter less than the first surface diameter,
  whereby a product delivery device complementary to the second surface can be disposed thereon and not longitudinally interfere with a valve attached to the valve attachment;
  a valve attached to the valve attachment and being operable to dispense product from the aerosol dispenser, the valve being sealed against one of the first surface and the second surface;
  a product delivery device disposed within the outer container and substantially disposed below the valve, the product delivery device being sealed to one of the second first surface and the second surface and being in fluid communication with the valve, one of the first surface and the second surface being a sealing surface to sealingly prevent escape of propellant from the outer container to ambient or to the product delivery device when a valve is attached to the valve attachment; and
  an actuator operably connected to the valve for selectively dispensing product from the aerosol dispenser upon demand.

In one embodiment the invention comprises a preform having a longitudinal axis and being usable, upon blow molding, as an outer container for a pressurized aerosol dispenser, the preform comprising:
  a closed end bottom and an open neck longitudinally opposed thereto, the open neck having a valve attachment having a valve attachment diameter,
  a first surface disposed below the valve attachment and having a first surface diameter less than the valve attachment diameter,
  a second surface disposed below the first surface and having a second surface diameter less than the first surface diameter, one of the first surface and the second surface being a sealing surface to prevent escape of propellant from the outer container to ambient or to the product delivery device when a valve is attached to the valve attachment,
  whereby a component complementary to the second surface can be disposed thereon and not interfere with a valve operable by a user when the valve is attached to the valve attachment.

BRIEF DESCRIPTION OF THE DRAWINGS

The drawings are to scale, unless otherwise noted as schematic.

FIG. 1 is a side elevational view of an aerosol dispenser according to the present invention, showing an actuator and spray being schematically dispensed from a nozzle, the actuator and nozzle being omitted from all subsequent figures.

FIG. 2 is a top plan view of the aerosol dispenser of FIG. 1.

FIG. 3A is a vertical sectional view taken along line 3-3 of FIG. 2 and showing the inner bag in its state as a preform.

FIG. 3B is a vertical sectional view taken along line 3-3 of FIG. 2 and showing the inner bag in its blow molded state as a bag.

DETAILED DESCRIPTION OF THE INVENTION

Figure 4A:
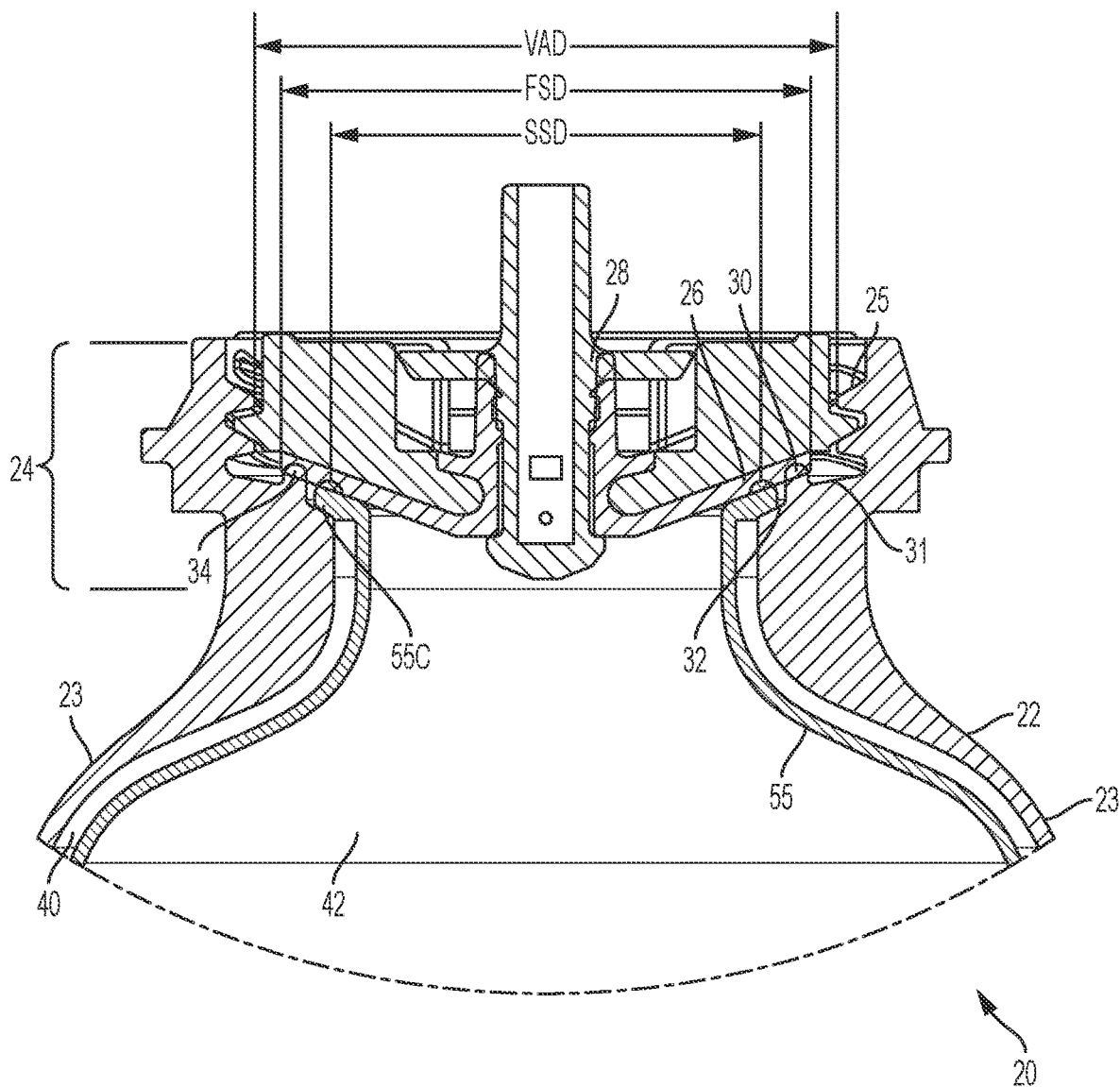
FIG. 4A is an enlarged fragmentary sectional view, taken from FIG. 3B.
Figure 4B:
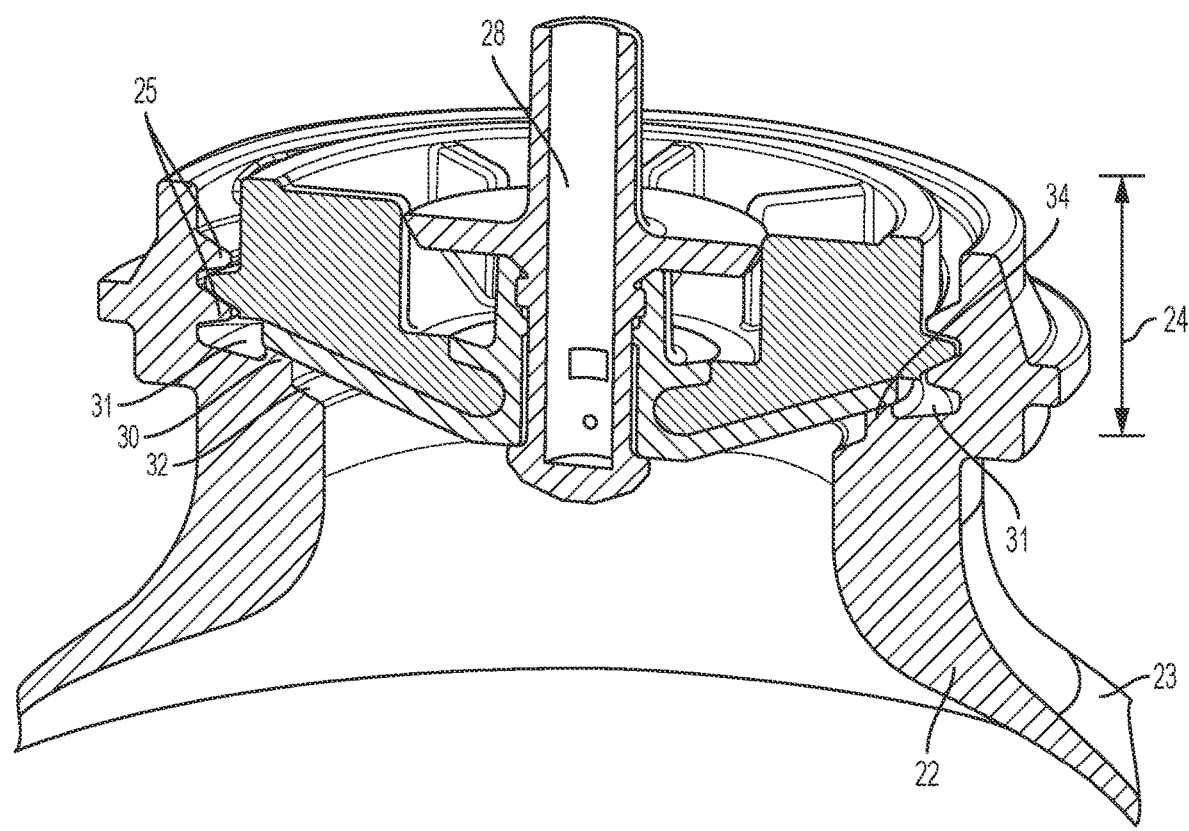
FIG. 4B is a perspective view of the aerosol dispenser of FIG. 4A, having the bag omitted for clarity.
Figure 4C:
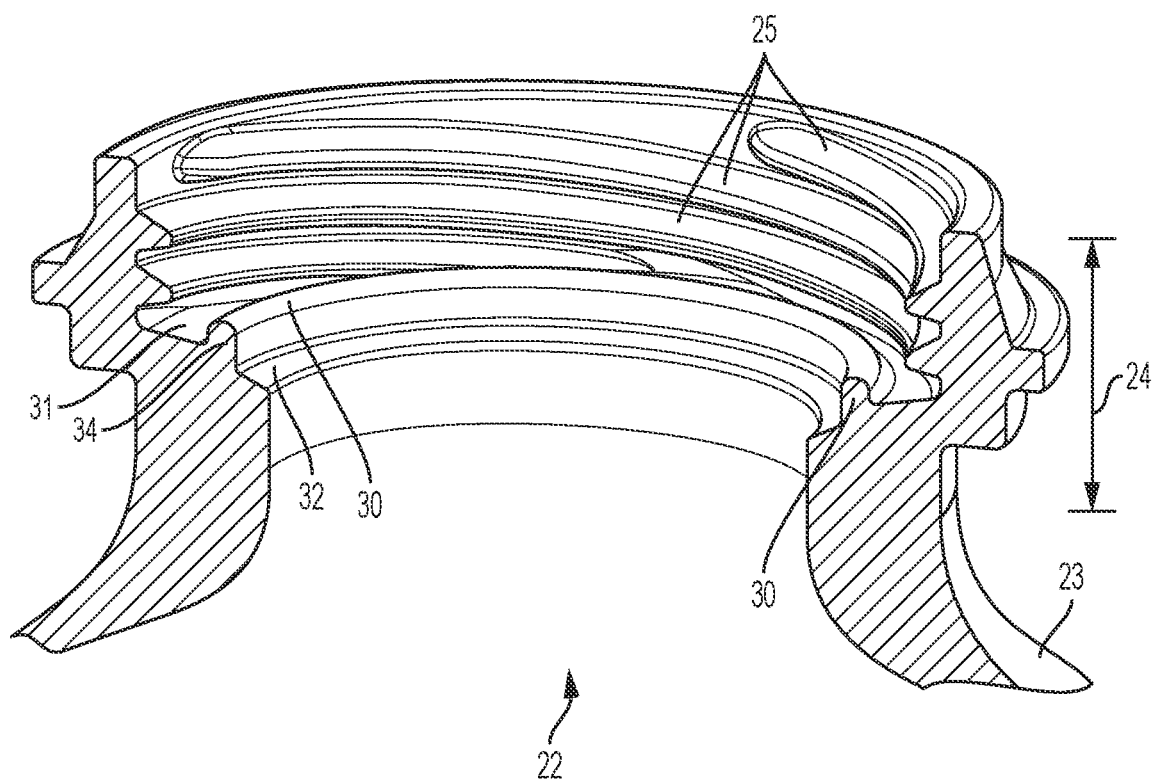
FIG. 4C is a perspective view of the aerosol dispenser of FIG. 4B, further having the valve omitted for clarity.

Referring to FIGS. 1 and 2, an aerosol dispenser 20 having a longitudinal axis is shown. The aerosol dispenser 20 comprises a pressurizeable outer container 22 usable for such an aerosol dispenser 20. The outer container 22 has a neck 24 into which a valve cup 26 is sealingly disposed. A valve 28 and actuator 29 may be disposed in the valve cup 26 for selective dispensing of product 42 from the aerosol dispenser 20. A seal 30 having a surface for sealing a valve 28 to the valve cup 26 may be disposed below the valve cup 26 and valve 28 to prevent escape of product 42 to ambient. As used herein, an aerosol container 20 may be a subset of an aerosol dispenser 20, and have an outer container 22, valve cup 26 sealed thereto with a bag 55/dip tube 56 joined to the valve cup 26, and optionally propellant 40, but not necessarily a valve 28, actuator 29, labeling, etc. Optionally the valve 28 may be directly joined to the outer container without a valve cup 26.

As used herein, the top of the aerosol dispenser 20 or the container 22 is taken as the uppermost part, when the aerosol dispenser 20 or container 22 is vertically oriented in its normal use or storage position. As used herein, the bottom of the aerosol dispenser 20 or the container 22 is taken as the lowermost part, when the aerosol dispenser 20 or the container 22 is vertically oriented in its normal use or storage position. The top and bottom are longitudinally opposed, with the top typically being open and bottom typically being a closed end. The terms 'above' and 'below' refer to relative positions towards and away from the top, respectively. Likewise the terms 'above' and 'below' refer to relative positions away from and towards the bottom, respectively.

The aerosol dispenser 20 and outer container 22 have a longitudinal axis, defining the main axis. The aerosol dispenser 20 and outer container 22 may be longitudinally elongate, i.e. having an aspect ratio of longitudinal dimension to transverse dimension[s] such as diameter greater than 1, an aspect ratio equal to 1 as in a sphere or shorter cylinder, or an aspect ratio less than 1.

The outer container 22 may comprise metal or preferably plastic, as are known in the art. The plastic may be polymeric, and particularly comprise polyethylene terephthalate (PET) or polypropylene (PP) for all of the components described herein. The outer container 22 may be injection molded or further blow molded in an ISBM process, as well known in the art. The outer container 22 defines a longitudinal axis and may have an opening at one end thereof. The opening is typically at the top of the pressurizeable container when the pressurizeable container is in its-in use position. The opening defines a neck 24, to which other components may be sealingly joined.

As the top of the outer container 22 is approached, the outer container 22 may have a neck 24. The neck 24 may be connected to the container sidewall by a shoulder 23. The shoulder 23 may more particularly be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

A normally closed valve 28 may be disposed in the neck 24. The valve 28 is openable upon demand by a user, in response to manual operation of an actuator 29. The actuator 29 may be depressedable, operable as a trigger, etc. to spray product 42 from the aerosol dispenser 20. Illustrative and non-limiting products 42 include shave cream, shave foam, body sprays, body washes, perfumes, cleansers, air treatments, astringents, foods, paint, insecticides, etc.

Referring to FIGS. 3A-3B, an optional valve cup 26 may be sealed to the opening of the outer container 22. The valve cup 26 may be sealed to the neck 24 of the outer container 22 using class 1 TPE material. Polyester based TPE sold by Kraiburg TPE GmbH & Co KG of Waldkraiburg, Germany under the name HTC8791-52 and sold by DuPont of Delaware under the name HYTEL may be used for good resistance to Silicone and adhesion to PET. Such a TPE material is believed to fall under Resin Identification Code 1/01 for PETE/PET, as set forth above by the Society of Plastics Industry and ASTM D7611. Or a Styrenic bloc copolymer based TPE such as Kraiburg HTC8791-24 or Krayton elastomer may be used, providing easier process and lower density. Other seal materials include silicone, rubber and similar conformable materials.

If desired, the valve cup 26 may be sealed to the container utilizing a press fit, interference fit, solvent welding, laser welding, sonic welding, ultrasonic welding, spin welding, adhesive or any combination thereof. An intermediate component, such as a sleeve or connector may optionally be disposed intermediate the valve cup 26 and neck 24 or top of the outer container 22. Any such arrangement is suitable, so long as a seal adequate to maintain the pressure results.

A valve 28, in turn, may be disposed within the valve cup 26. The valve 28 provides for retention of product 42 within the aerosol dispenser 20 until the product 42 is selectively dispensed by a user. The valve 28 may be selectively actuated by an actuator 29. A nozzle 27 and related valve 28 components may optionally be included, depending upon the desired dispensing and spray characteristics. The valve 28 may be attached using conventional and known means. The valve 28 and actuator 29 may be conventional and do not form part of the claimed invention. Selective actuation of the valve 28 allows the user to dispense a desired quantity of the product 42 on demand.

The valve 28 may provide for dispensing from the top of the bag 55/dip tube 56 through one or more ports and into the valve stem. Optionally, the valve 28 may have a bypass outside the ports to accommodate relatively viscous product 42.

A product delivery device 55, 56 may be used to contain and/or provide for delivery of product 42 from the aerosol dispenser 20 upon demand. Suitable product delivery devices 55, 56 comprise pistons, bags 55, dip tubes 56, and do not form part of the claimed invention, except as specifically claimed herein. If desired, the product delivery device 55, 56 may further comprise a metering device for dispensing pre-determined, metered quantities of product 42, as described in U.S. Pat. Nos. 2,815,889; 4,142,652 and 5,421,492. The product delivery device 55, 56 may also comprise an inverting valve having a ball therein to alter product 42 flowpath.

If desired the product delivery device 55, 56 may comprise a dip tube 56 disposed in a bag 55. Such a dip tube 56 may reach to nearly the bottom of the bag 55, or be juxtaposed near the middle of the bag 55. A dip tube may be made according to U.S. Pat. No. 8,091,741.

The pressurizeable container may further include a propellant 40. The propellant 40 may comprise hydrocarbons, nitrogen, air and mixtures thereof. Propellant 40 listed in the US Federal Register 49 CFR 1.73.115, Class 2, Division 2.2 are also considered acceptable. The propellant 40 may particularly comprise a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or SOLSTICE.

If desired, the propellant 40 may be condensable. Generally, the highest pressure occurs after the aerosol dispenser 20 is charged with product 42 but before the first dispensing of that product 42 by the user. A condensable propellant 40, when condensed, provides the benefit of a flatter depressurization curve at the vapor pressure, as product 42 is depleted during usage. A condensable propellant 40 also provides the benefit that a greater volume of gas may be placed into the container at a given pressure. A condensable propellant 40, such as HFO-1234ze, may be charged to a gage pressure of 100-400 kPa at 21 degrees C.

If desired, the outer container 22, valve cup 26, valve 28, and/or piston may be polymeric. By polymeric it is meant that the component is formed of a material which is plastic, comprises polymers, and/or particularly polyolefin, polyester or nylons, and more particularly PET. Thus, the entire aerosol dispenser 20 or, specific components thereof, may be free of metal, allowing microwaving. Microwave heating of the aerosol dispenser 20 or pressurizable container therefor provides for heating of the product 42 prior to dispensing. Heating of the product 42 prior to dispensing may be desirable if the product 42 is applied to the skin, becomes more efficacious at lower viscosities, or is to be eaten.

The valve cup 26 may have a valve cup 26 periphery complementary to the neck 24 periphery. At least one of the valve cup 26 and/or container neck 24 may have one or more channels therethrough. Additionally or alternatively, the channels may be formed at the interface between the valve cup 26 and container neck 24. The channels may be formed by irregularities, such as crenulations, merlins, serrations, notches, teeth, etc. between valve cup 26 and/or container neck 24.

The outer container 22, and all other components, optionally excepting the TPE seal, may comprise, consist essentially of or consist of PET, PEN, Nylon, EVOH or blends thereof to meet DOT SP 14223. All such materials may be selected from a single class of recyclable materials, as set forth above by the Society of Plastics Industry and ASTM D7611. Particularly all components of the aerosol dispenser 20 may comprise the aforementioned TPE and PET/PETE, Resin Identification Code 1/01. This material selection provides the benefit that the entire aerosol dispenser may advantageously be recycled in a single stream.

Alternatively, the valve cup 26 and/or bag 55 may comprise plural layers such as nylon with EVOH, PET and/or polyolefin materials. Three layers may be utilized, such as PET/Nylon/PET or PET/EVOH/PET. The layers may be co-molded or overmolded. The multi-layer arrangements may provide increased barrier resistance and reduced failure rates.

If desired, the outer container 22, and/optionally the product delivery device 55, 56, may be transparent or substantially transparent. This arrangement provides the benefit that the consumer knows when product 42 is nearing depletion and allows improved communication of product 42 attributes, such as color, viscosity, etc. Also, labeling or other decoration of the container may be more apparent if the background to which such decoration is applied is clear.

Suitable decoration includes labels 57. Labels 57 may be shrink wrapped, printed, etc., as are known in the art.

The outer container 22 may define a longitudinal axis of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 60 cm, and particularly 10 to 40 cm in height, taken in the axial direction and from 3 to 60 cm, and particularly 4 to 10 cm in diameter if a round footprint is selected. The outer container 22 may have a volume ranging from 40 to 1000 cc exclusive of any components therein, such as a product delivery device 55, 56. The outer container 22 may be injection stretch blow molded. If so, the injection stretch blow molding process may provide an overall stretch ratio of greater than 8, 8.5, 9, 9.5, 10, 12, 15 or 20 and less than 50, 40 or 30.

The outer container 22 may sit on a base. The base is disposed on the bottom of the outer container 22. Suitable bases include petaloid bases, champagne bases, hemispherical or other convex bases used in conjunction with a base cup. Or the outer container 22 may have a generally flat base with an optional punt.

A manifold may supply propellant 40, under pressure, through at least one channel between the valve cup 26 and container neck 24. The manifold may be retractingly disposed above the container 22. The manifold may be brought into contact with the valve cup 26, forming a temporary seal therebetween. Suitable channels are particularly described in commonly assigned U.S. Pat. No. 8,869,842 to Smith at FIG. 8, column 7, lines 57 to column 8, line 2 and column 8, lines 44-60. While the temporary seal is established between the manifold and valve cup 26, the propellant 40 may be charged into the outer container 22.

The aerosol dispenser 20, as presented to a user may have an initial pressure. The initial pressure is the highest pressure encountered for a particular filling operation, and corresponds to no product 42 yet being dispensed from the product delivery device 55, 56. As product 42 is depleted, the outer container 22 approaches a final pressure. The final pressure corresponds to depletion of substantially all product 42, except for small residual, from the product delivery device 55, 56. One benefit of the invention is that the residual product 42, remaining at end of life, is unexpectedly minimized.

This arrangement provides the benefit that propellant 40 may be charged to a lesser pressure than the desired starting pressure, decreasing propellant 40 charge time and reducing pressure applied to the charging machinery. Another benefit is that propellant 40 is disposed as needed for the end use when the aerosol dispenser 20 is ready for sale, product 42 fill and upon product 42 depletion may be recharged with product 42 and reused.

At 21 degrees C., the outer container 22 may be pressurized to an internal gage pressure of 100 to 1300, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, and any values therebetween.

If a permanent seal between components of the aerosol dispenser 20 is desired, the seal may be welded. Particularly, if the components have compatible melt indices, such components may be sealed by welding to retain propellant therein. Suitable welding processes may include sonic, ultrasonic, spin, and laser welding. Welding may be accomplished with a commercially available welder, such as available from Branson Ultrasonics Corp. of Danbury, Conn. Alternatively or additionally, the channel may prophetically be blocked by a plug or sealed by adhesive bonding. Suitable sealing processes are particularly described in commonly assigned U.S. Pat. No. 8,869,842 to Smith at FIG. 9 and column 8, lines 30-43.

Referring to FIGS. 4A, 4B, 4C, 5A, 5B and 5C, and examining the components in more detail, the valve cup 26 may have a valve attachment, such as threads 25. The threads 25 may or may not circumscribe the neck 24, as desired. One or more threads 25 may be utilized, with four threads 25, each thread 25 subtending about 90 degrees having been found suitable. The valve 28 may have complementary external threads. The valve is assembled into the valve cup 26 by screwing onto the complementary threads 25. While the valve attachment is shown to be internal threads 25, one of skill will recognize the valve attachment is not so limited. A snap fitting or bayonet fitting may be used for the valve attachment. The valve attachment may also comprise a TPE snap seal.

The threads 25 may be integrally molded with the container 22 or with the valve cup 26. This arrangement provides threads 25 within the neck 24 of the outer container 22, to accept a valve 28. By integral it is meant that the threads 25 and substrate from which the threads 25 radially protrude are made together cannot be separated with destruction or unintended gross deformation, and are preferably molded in the same operation.

The valve attachment, including threads 25, or other interlock, has a valve attachment diameter VAD. The valve attachment diameter VAD is measured at the smallest respective diameter, such as the thread land, as the smallest diameter controls insertion of components through the valve cup 26.

The valve cup 26 may have an optional seal 30. The seal 30 is between the inside of the valve cup 26 and valve 28. The seal 30 prevents escape of product 42 and attendant propellant 40 if a dip tube 56 configuration is used or escape of product 42 if a bag 55 is used. The seal 30 diameter is less than the thread 25 diameter, as described below.

The seal 30 is disposed below the threads 25. By 'below' it is meant the seal 30 is proximal towards the base of the container 22 relative to the threads 25. That is, the seal 30 is preferably entirely disposed between the bottom thread 25 and the base of the container 22. The seal 30 is smaller in diameter than the threads, so that the complementary component, such as a valve, can be inserted through the threads 25.

The seal 30 provides a friction fit or compression fit against loss of pressurized product 42 and/or propellant 40 to ambient. The seal 30 may be smaller in diameter than the valve 28, so that the seal 30 is compressed upon insertion of the valve. The seal 30 goes into compression due to compressive forces applied by the valve 28 when threaded or otherwise fitted into the neck 24. If desired particular material for the seal 30 may be co-injected with the valve cup 26.

A first sealing surface 31 is disposed below the valve attachment 25 and has a first sealing surface diameter FSD which is less than the valve attachment diameter, VAD. A second sealing surface 32 is disposed below the first sealing surface 31 and has a second sealing surface diameter SSD less than the first sealing surface diameter FSD. The first sealing surface 31 may provide support for the valve 28, which may be disposed between the first sealing surface 31 and the valve attachment 25. The second sealing surface 32 may provide support for the product delivery device 55, 56, which may be disposed between the second sealing surface 32 and the valve 28.

This arrangement advantageously allows for assembly of any desired product delivery device 55, 56 providing it is sealingly complementary to the second sealing surface 32. This arrangement then advantageously allows for subsequent assembly of any desired valve 28, providing it is sealingly complementary to the first sealing surface 31. Thus any combination and variety of bags 55, dip tubes 56 and valves 28 may be used with a single outer container 22. This arrangement advantageously minimizes production and storage of a variety of outer containers 22, in lieu of only a single outer container 22 being required for any particular size of aerosol dispenser 20.

Either or both of the first surface 31 and/or second surface 32 may be a sealing surface. By sealing surface it is meant that a valve 28 may be seated upon the first sealing surface 31 without leakage of propellant 40 therebetween to ambient. Likewise, by sealing surface it is meant that a product delivery device 55, 56 may be seated upon the second sealing surface 32 without leakage of propellant 40 therebetween to ambient. It is to be understood the first surface 31 may or may not be a first sealing surface 31 provided adequate seal is elsewhere provided. Likewise, the second surface 32 may or may not be a second sealing surface 32 provided adequate seal is elsewhere provided.

A component complementary to the second sealing surface 32 can be disposed thereon and not interfere, particularly in the longitudinal direction, with a valve 28 operable by a user when the valve 28 is attached to the valve attachment 25. It is only necessary that the valve 28 fit to the first sealing surface in operable relationship. This arrangement provides the benefit that multiple valves 28 may be used with a single outer container 22, depending upon the particular product[s] 42 desired.

The first surface may have a diameter FSD of 7 to 23 mm and preferably 10 to 20 mm. The threads 25 may have a diameter VAD of 10 to 30 mm, and preferably 15 to 25 mm A thread 25 diameter VAD of 18.3 mm and a first surface 30 diameter VAD of 13.6 mm have been found suitable. The first sealing surface 31 may be longitudinally disposed at least 1 mm, particularly 1 to 5 mm below the lowest thread 25. The second sealing surface 32 may have a diameter SSD less than the threads 25 or other valve attachment diameter VAD and greater than the first sealing surface 32 diameter FSD.

Likewise, multiple components may be disposed on the second sealing surface 32, so long as such second component remains below the valve 28. The second component may be a bag 55 or a dip tube 56. The bag 55 or a dip tube 56 may have a bag collar 55C or dip tube collar 56C on the top thereof. The collar 55C, 56C, may be disposed on and seal against the second sealing surface 32.

The collars 55C, 56C, may have an optional bead, as shown. Or the collars 55C, 56C may simply provide an annular surface for positioning and sealing the bag 55, dip tube 56. This arrangement provides the benefit that multiple product delivery devices 55, 56, such as a bag 55 or dip tube 56, may be used with a single outer container 22, depending upon the particular product 42 desired.

The first sealing surface 31 may be concentric to the longitudinal axis and frustroconical, as shown. This arrangement provides the benefit that a valve 28 disposed thereon will seat to the lowest point, i.e. having the smallest diameter. The valve 28 is disposed in the proper position without a separate step required in the manufacturing process.

The second sealing surface 32 may be concentric and perpendicular to the longitudinal axis and annular, as shown. This arrangement provides the benefit that a component disposed thereon will seat concentric and below the first sealing surface 32. The product delivery device 55, 56 is disposed in the proper place without a separate step required in the manufacturing process. The product delivery device 55, 56, or other component, is installed and seated before the valve 28 is inserted.

If desired, the first sealing surface 31 and second sealing surface 32 may be contiguous. This arrangement provides the benefit that the first sealing surface 31 and second sealing surface 32 need not be separately assembled during manufacturing, simplifying production and reducing the opportunity for mistakes. More particularly, in one preferred embodiment the first sealing surface 31 and second sealing surface 32 may be mutually integral and integral with the outer container 22. This arrangement provides the benefit of ease of manufacture, by eliminating unnecessary assembly of multiple parts.

Figure 6:
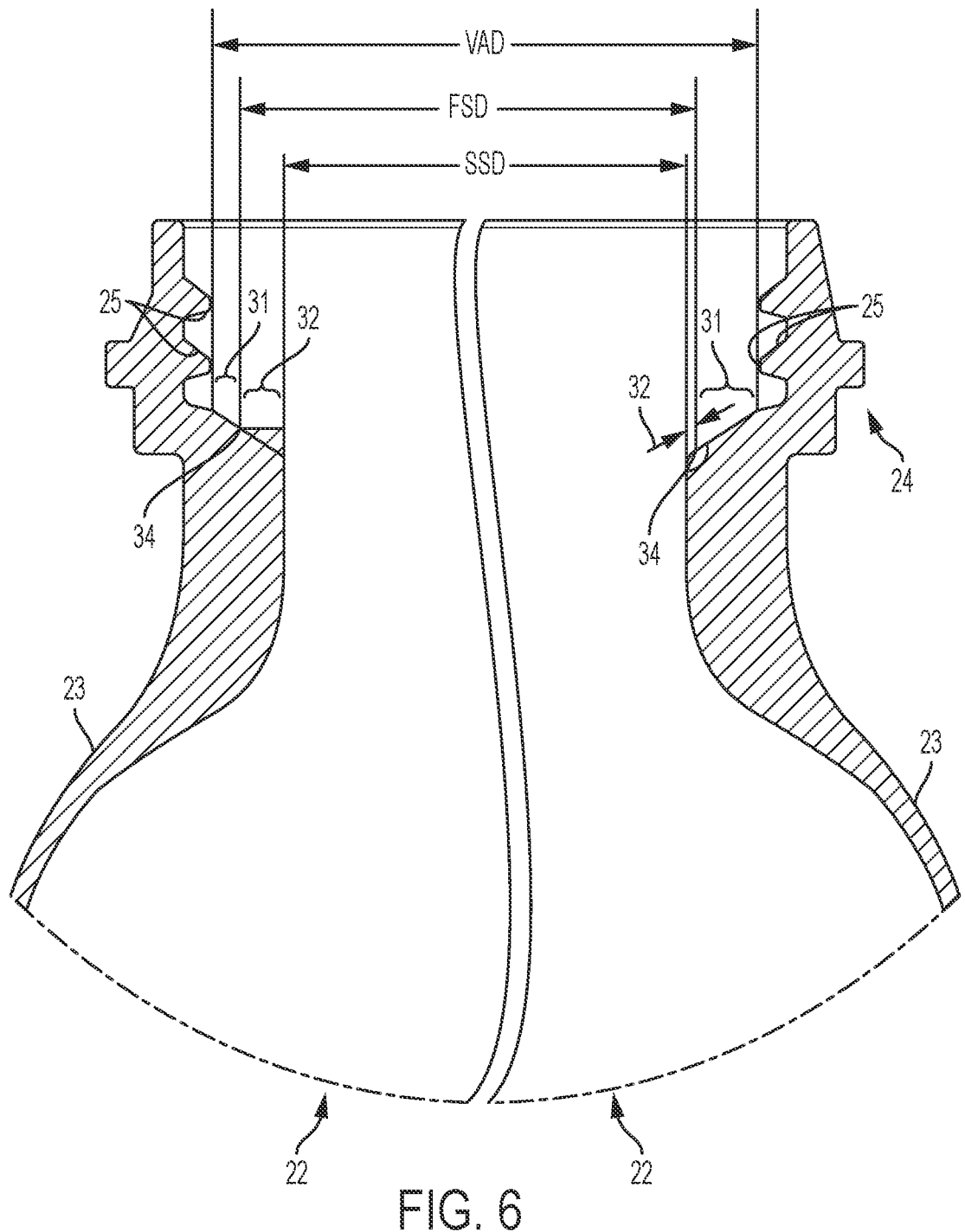
FIG. 6 is a broken, enlarged, instantaneous fragmentary sectional view of an outer container having contiguous and non-coplanar first and second sealing surfaces generally perpendicular, with the first sealing surface oblique to the longitudinal axis and the second surface perpendicular to the longitudinal axis on the left side of the drawing and both of the first sealing surface and second sealing surface oblique to the longitudinal axis on the right side of the drawing.

Referring to FIG. 6, one of skill will recognize that the first sealing surface 31 may be generally perpendicular to the longitudinal axis and second sealing surface 32 may be obliquely angled thereto. Or the first sealing surface 31 may be generally oblique to the longitudinal axis and the second sealing surface 32 generally perpendicular thereto. Or both the first sealing surface 31 and second sealing surface 32 may both be obliquely angled relative to the longitudinal axis, but have mutually different oblique angles relative thereto. If both the first sealing surface 31 and second sealing surface 32 are oblique, either such surface 31, 32 may be more steeply angled relative to the longitudinal axis.

Figure 7:
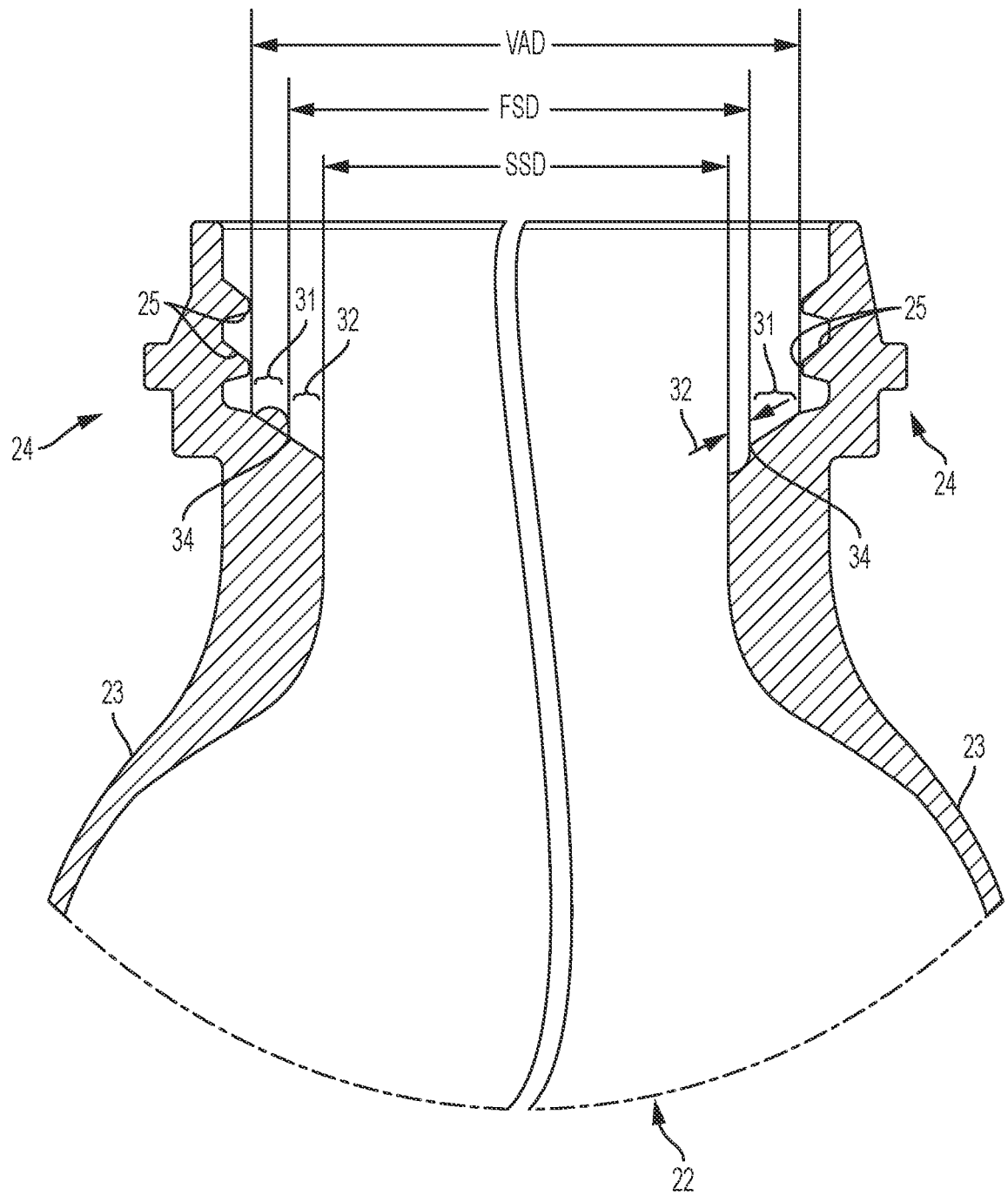
FIG. 7 is a broken, enlarged, instantaneous fragmentary sectional view of an outer container having a convex first sealing surface on and rectilinear second sealing surface on the left side of the drawing and a rectilinear first sealing surface and concave second sealing on the right side of the drawing.

Referring to FIG. 7, either or both of the first sealing surface 31 and second sealing surface 32 may be convex, concave or rectilinear in any suitable combination or arrangement thereof. If desired, a separate seal may be disposed within a concave sealing surface 31, 32. As noted above, the valve 28 is complementary to the first sealing surface 31 and product delivery device 55, 56 complementary to the second sealing surface 32.

Figure 8A:
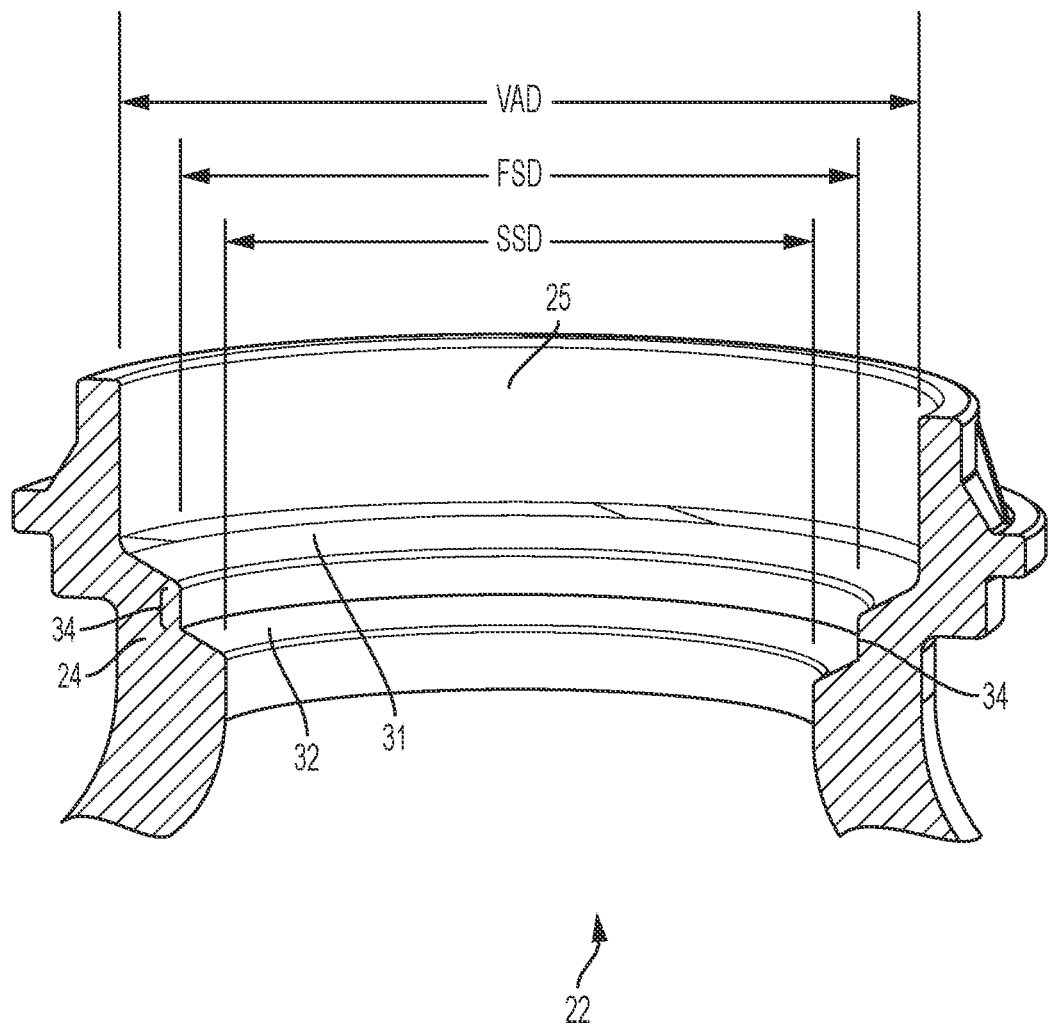
FIG. 8A is an enlarged fragmentary perspective view of an outer container having generally parallel first surface and second surface, both oblique to the longitudinal axis.
Figure 8B:
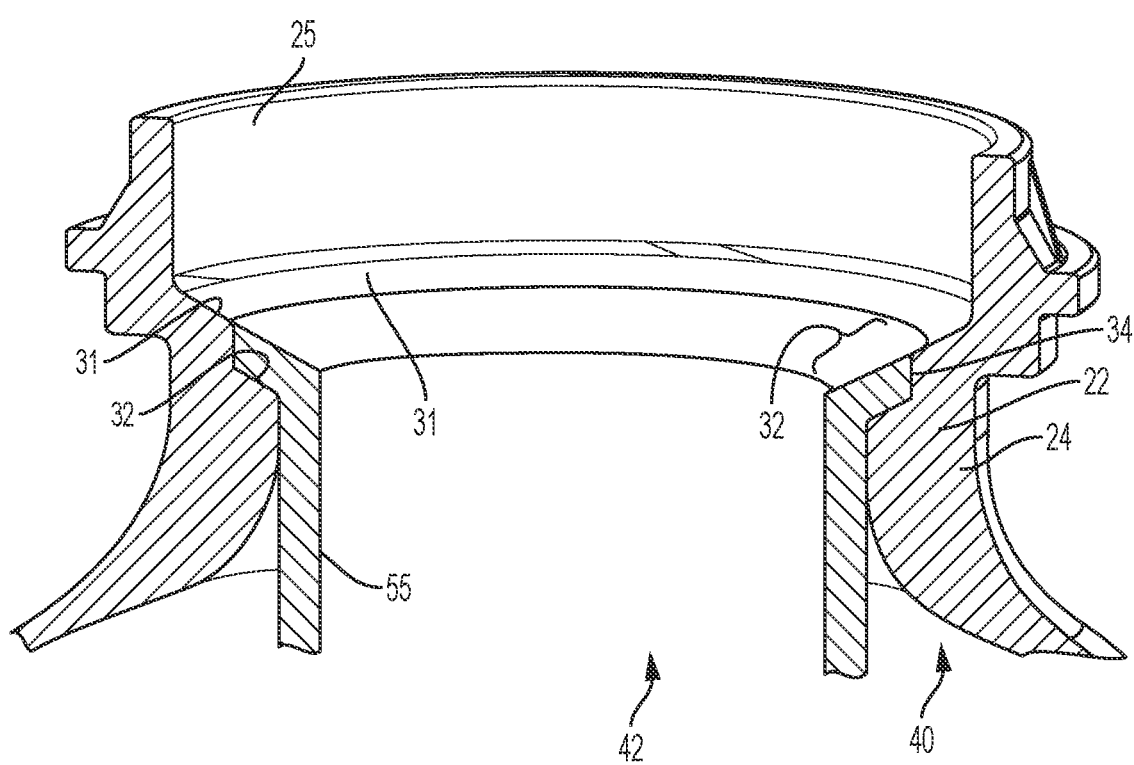
FIG. 8B is an enlarged fragmentary perspective view of the embodiment of FIG. 8A having a bag inserted therein for a product delivery device.
Figure 8C:
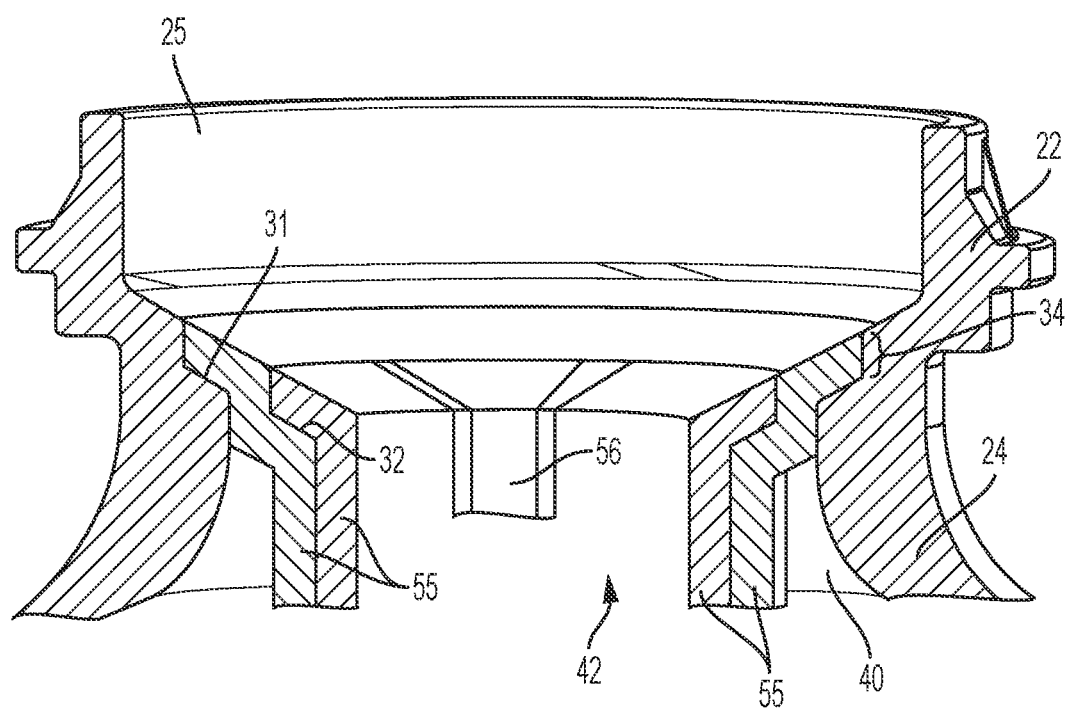
FIG. 8C is an enlarged fragmentary perspective view of the embodiment of FIG. 8B having two coaxial bags inserted therein for a single product delivery device and showing an optional dip tube in the single product delivery device.

Referring to FIGS. 8A, 8B and 8C in each of the foregoing embodiments, the first sealing surface 31 and second sealing surface 32 are generally contiguous in the absence of seal 30. But the first sealing surface 31 and second sealing surface 32 may be longitudinally spaced apart without departure from the invention claimed herein. The first sealing surface 31 and second sealing surface 32 may be mutually skewed or mutually parallel in a degenerate case.

If desired, two or more product delivery devices 55, 56 may be used with the aerosol dispenser 20 of the present invention. Such plural product delivery devices 55, 56 may include one or more bags 55, one or more dip tubes 56 or any combinations thereof. The plural product delivery devices may be coaxial or parallel. This arrangement provides the benefit that plural products 42 may be co-dispensed, but not intermixed until the point of use.

Referring to FIGS. 1-8C, the foregoing aerosol dispensers 20, outer containers 22 and preforms 60, each have a transition 34 between the first sealing surface 31 and the second sealing surface 32. The transition 34 is any discernable break dividing the first sealing surface 31 and the second sealing surface 32. Of course there may be three or more sealing surfaces 31, 32, having respective transitions, 34, providing the sealing surfaces 31, 32 are appropriately sized. The transitions 34 provide the benefit that each of the first sealing surface 31 and second sealing surface 32 can be specifically tailored to its particular function of sealingly retaining the valve 28 and product delivery device 55, 56, respectively.

Referring to FIGS. 1-5C, the transition 34 is annular seal 30. The annular seal 30 can be a bead of any suitable size and cross section.

Referring to FIG. 6, the transition 34 between the first sealing surface 31 and the second sealing surface 32 is a change in slope between the first sealing surface 31 and the second sealing surface 32. The left side of FIG. 6 shows that the second sealing surface 32 has less slope relative to the longitudinal axis than the first sealing surface 32. Conversely the right side of FIG. 6 shows that the second sealing surface 32 has greater, i.e. steeper) slope relative to the longitudinal axis than the first sealing surface 32.

Referring to FIG. 7, the transition 34 between the first sealing surface 31 and the second sealing surface 32 is a change between a flat, concavity or convexity on the first sealing surface 31 and another flat, concavity or convexity on the second sealing surface 32. The left side of FIG. 7 shows that the first sealing surface 31 has a convexity and the second sealing surface 32 has a flat. Conversely the right side of FIG. 7 shows that the first sealing surface 31 has a flat and the second sealing surface 32 has a concavity. But it is to be understood that the transition 34 is any distinction between any combination of concavities, convexities and flats, including two distinguishable concavities, two distinguishable convexities, two distinguishable flats, a convexity and flat, a concavity and flat, a concavity and convexity, all in any combination or allocation between the first sealing surface 31 and the second sealing surface 32.

Referring to FIGS. 8A-8C, the transition 34 may comprise a step between the first sealing surface 31 and the second sealing surface 32. The step may be a longitudinal break, between a mutually parallel or mutually skewed first sealing surface 31 and second sealing surface 32.

Figure 9:
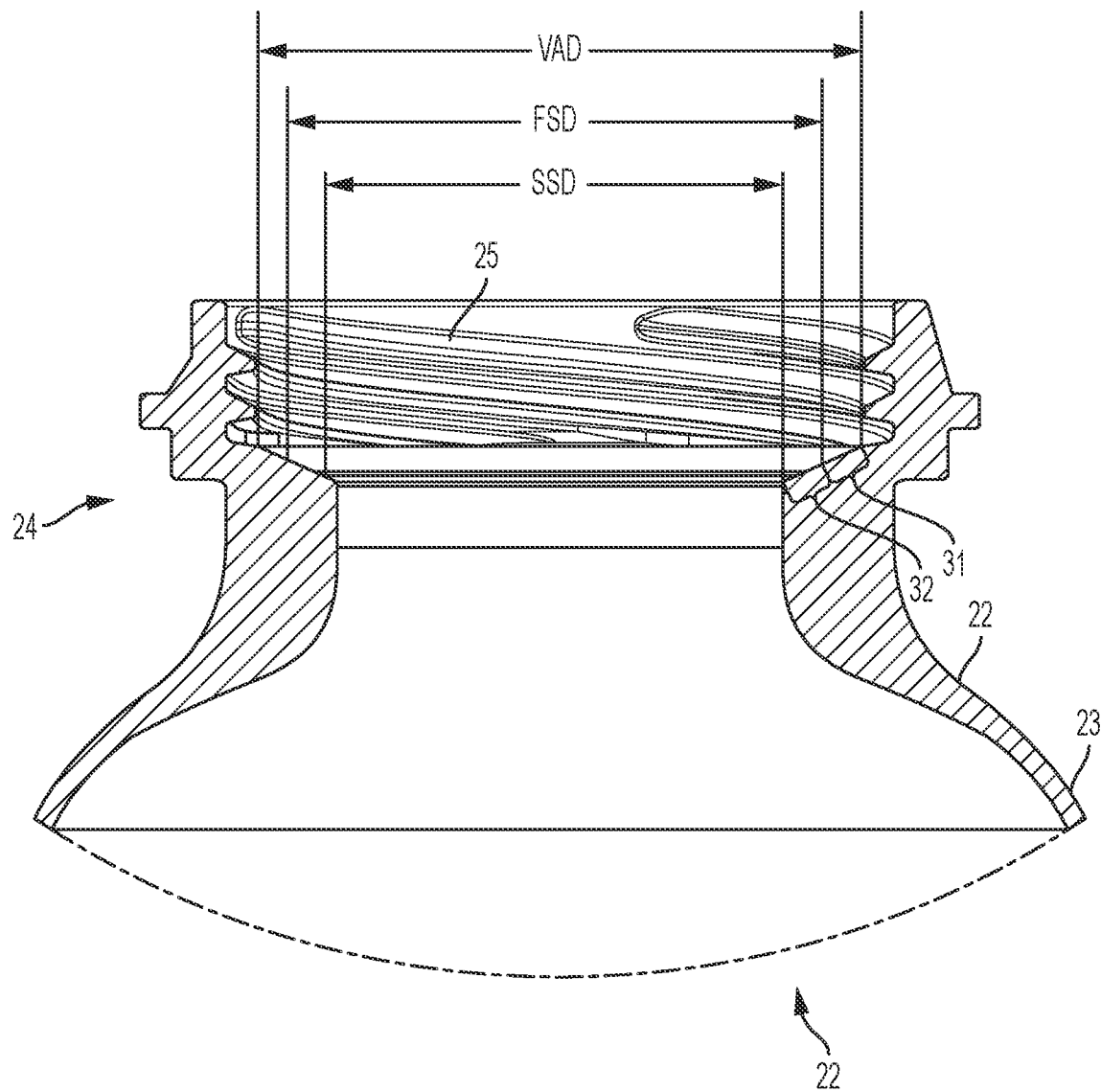
FIG. 9 is an enlarged fragmentary sectional view of an outer container having contiguous and coplanar first and second sealing surfaces and not having an optional seal therebetween.
Figure 10:
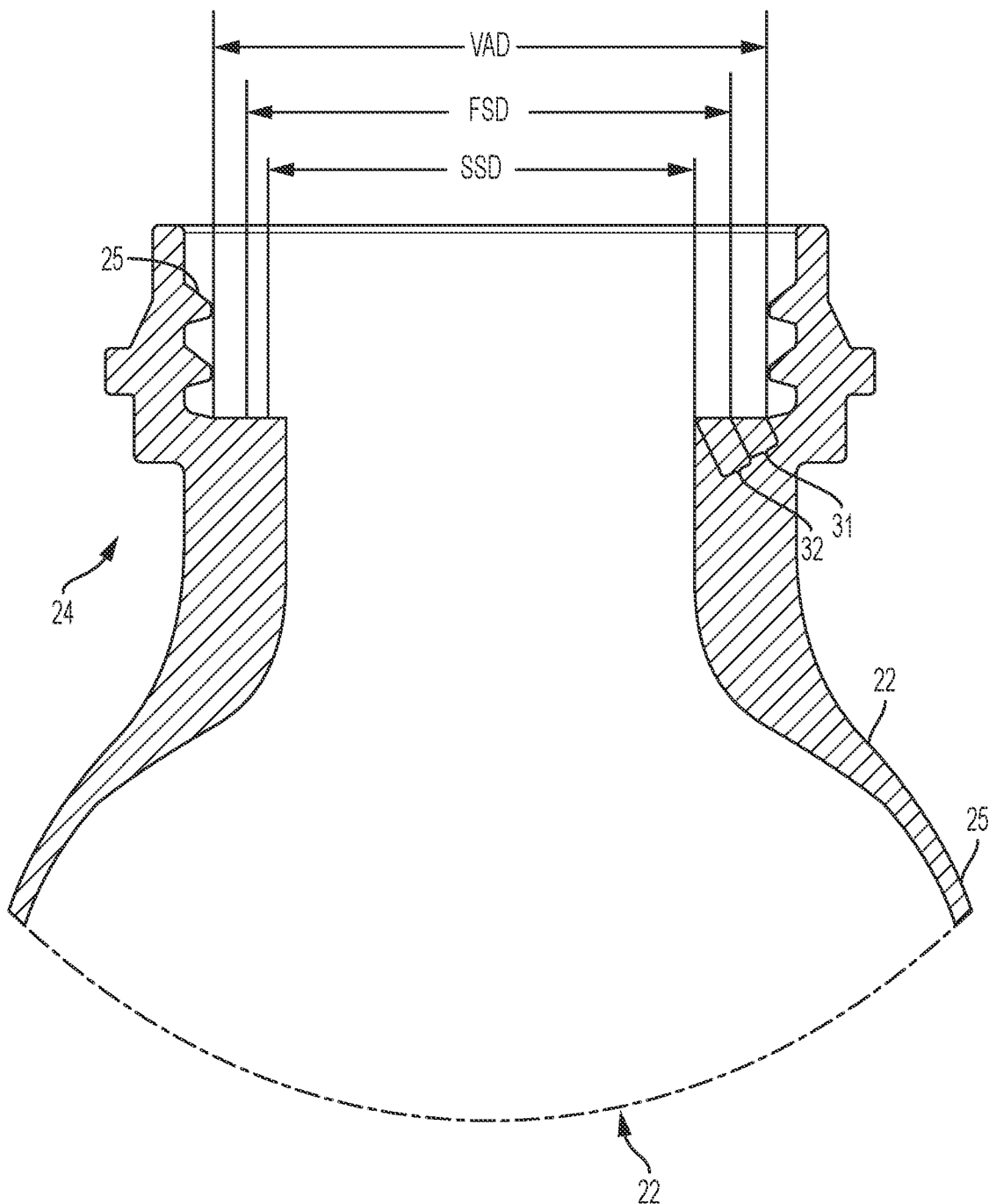
FIG. 10 is an enlarged, instantaneous fragmentary sectional view of an outer container having contiguous and coplanar first and second sealing surfaces generally perpendicular to the longitudinal axis and not having an optional seal therebetween.

Referring to FIGS. 9-10, an aerosol dispenser 20 according to the present invention need not have a transition 34 between the first sealing surface 31 and the second sealing surface 32. It is the benefits of the present invention to provide a chassis for multiple combinations of valves 28 and product delivery devices 55, 56 using the first sealing surface 31 and the second sealing surface 32.

Referring to FIG. 9, first sealing surface 31 and second sealing surface 32 may be coplanar, i.e. comprise a single, contiguous frustum of a cone. This arrangement provides the benefit that the product delivery device 55, 56 and valve 28 may each be concentrically seated by the funnel wall of the seal 30.

Referring to FIG. 10, the first sealing surface 31 and second sealing surface 32 may each be disposed generally perpendicular to the longitudinal axis, provided the second sealing surface 32 still has a smaller diameter SSD than the diameter FSD of the first sealing surface 31. This arrangement provides the benefit that the peripheries of the first sealing surface 31 and second sealing surface 32 may prevent undue radial movement of the valve 28 and product delivery device 55, 56, respectively. It is to be understood that the embodiments of, for example, FIGS. 9-10, have first sealing surface 31 and second sealing surface 32 in contiguous relationship and uninterrupted by an optional seal 30.

The absence of an optional transition 34, as shown in FIGS. 1-8C, provides the benefit of manufacturing flexibility, to accommodate valve 28 and product delivery device 55, 56 of different radial and longitudinal dimensions. While first sealing surface 31 and second sealing surface 32 are shown to be in specific and fixed in relationship, one of skill will recognize the invention is not so limited. Utilizing a preform 60/outer container 22/aerosol dispenser 20 according to these and like embodiments offers manufacturing flexibility not previously found in the art. These embodiments allow the manufacturer to select a number of suitable valves 28, so long as they fit onto the first sealing surface 31.

A first valve 28, suitable for a first product 42, may have a first annular footprint on first sealing surface 31. A second valve 28, suitable for a second product 42, may have a second, and different, annular footprint on first sealing surface 31, etc. The chassis provided by the preform 60/outer container 22/aerosol dispenser 20 provides this flexibility for multiple valves 28, provided that sufficient footprint is available on second sealing surface 32 to accommodate the product delivery device 55, 56.

Thus a product delivery device 55, 56, suitable for a first product 42, may have a first annular footprint on second sealing surface 32. A second product delivery device 55, 56, suitable for a second product 42, may have a second, and different, annular footprint on second sealing surface 32, etc. The chassis provided by the preform 60/outer container 22/aerosol dispenser 20 provides this flexibility for multiple The chassis provided by the preform 60/outer container 22/aerosol dispenser 20 provides this flexibility for multiple valves 28, provided that sufficient footprint is available on second sealing surface 32 to accommodate the product delivery devices 55, 56, provided that sufficient footprint is available on first sealing surface 31 to accommodate the valve 28.

If desired, the valve 28 may be stacked on and overlap bag 55/dip tube 56. This arrangement provides the benefit of a common seal annulus and increased flexibility in sizing the valve 28/bag 55/dip tube 56.

Referring to FIGS. 4A, 4B, 5A, 5B and 5C, the assembly of the valve 28 onto the outer container 22 intended to be permanent, although the valve 28 may be replaced if desired. For example, the aerosol dispenser 20 may be refilled and reused with a different product 42, necessitating a new valve suitable for that particular product 42.

If desired, the valve 28 may be attached to an optional valve cup 26. Optionally the product delivery device 55, 56, particularly a bag 55 or dip tube 56, may be attached to, and more particularly integrally attached to, the valve cup 26. A suitable configuration is disclosed in commonly assigned P&G Case 14461, application Ser. No. 15/235,279, filed Aug. 12, 2016, particularly as disclosed in FIGS. 1C-1D thereof.

If desired, the outer container 22 and propellant 40 may be assembled at a first location. The product 42, decoration, etc. may be added at a second location, as described in commonly assigned 2012/0292338 and 2012/0291911.

Referring back to FIGS. 3A and 5A, a preform 60 can be made in a single injection molding operation, providing tolerances suitable for mass production. A first preform 60 is then blow molded in known fashion to make the outer container 22. The threads 25 are above the blow molding operation, preventing undue dimensional distortion thereof. A second preform 60 can be used to make the valve cup 26 as the finish and internal bag 55 as the body upon blow molding thereof. One of skill will understand the blow molding step may also include stretching as is known in the art.

Referring to FIGS. 3B and 4A, the bag 55 can be integral with the valve cup 26. By integral it is meant that the bag 55 and valve cup 26 are monolithic, molded at the same time or molded of two different materials melted together in a permanent manner. An integral bag 55 and valve cup 26 cannot be separated into two components without tearing or undue deformation. A container 22 made from a preform 60 using ISBM is referred to herein as a molded container 22.

The bag 55 may be integrally injection molded with the valve cup 26. If the preform 60 is to be stretched into a bag 55, the preform 60 may have a wall thickness of 1 to 3 mm. The resulting bag 55 is collapsible upon depletion of product 42 therefrom. The resulting bag 55 may have a thickness of 0.07 to 0.2 mm.

Figure 5A:
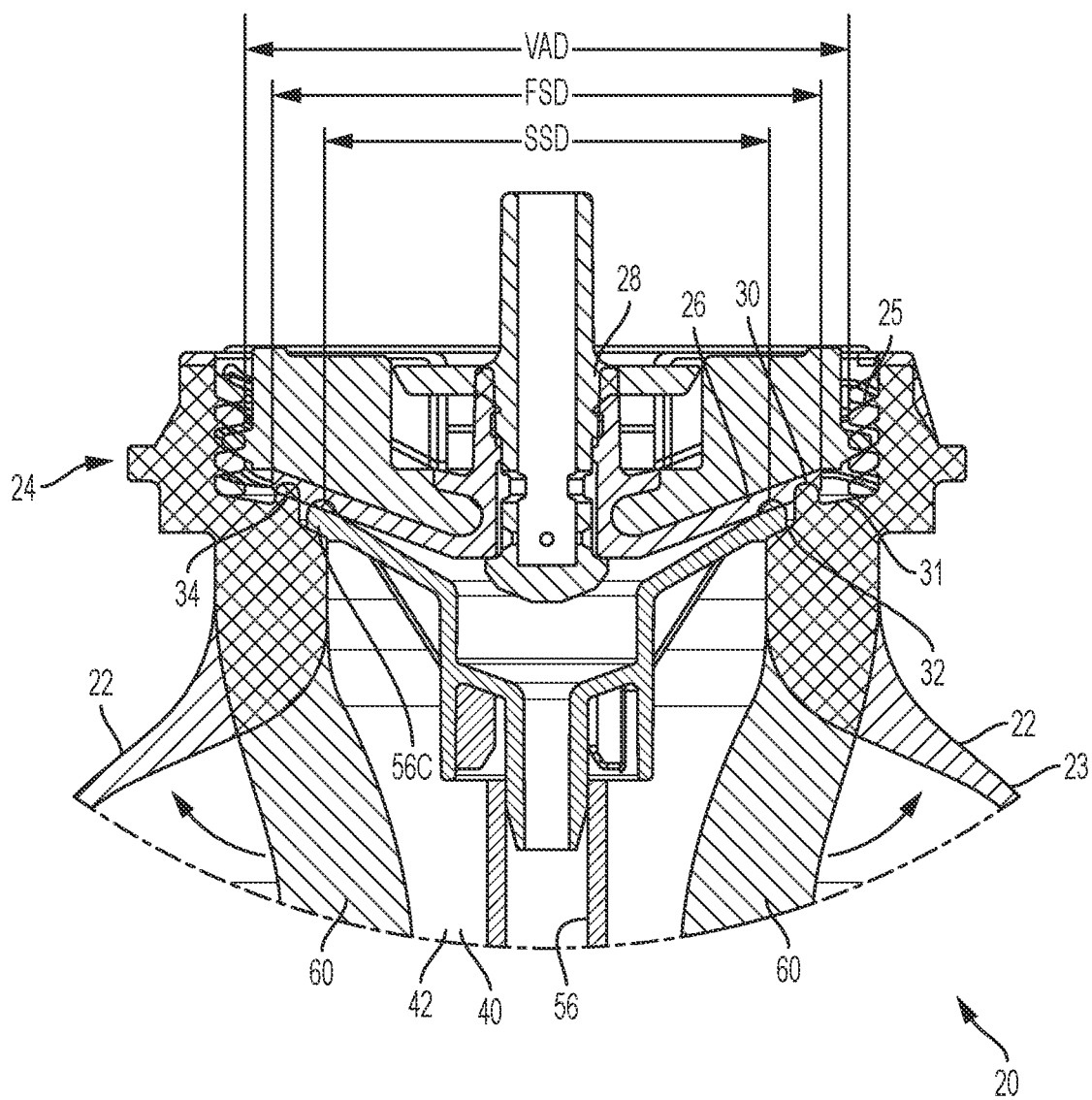
FIG. 5A is an enlarged fragmentary sectional view of a variant embodiment having a dip tube, and showing the outer container preform in its original state and blow molded state.
Figure 5B:
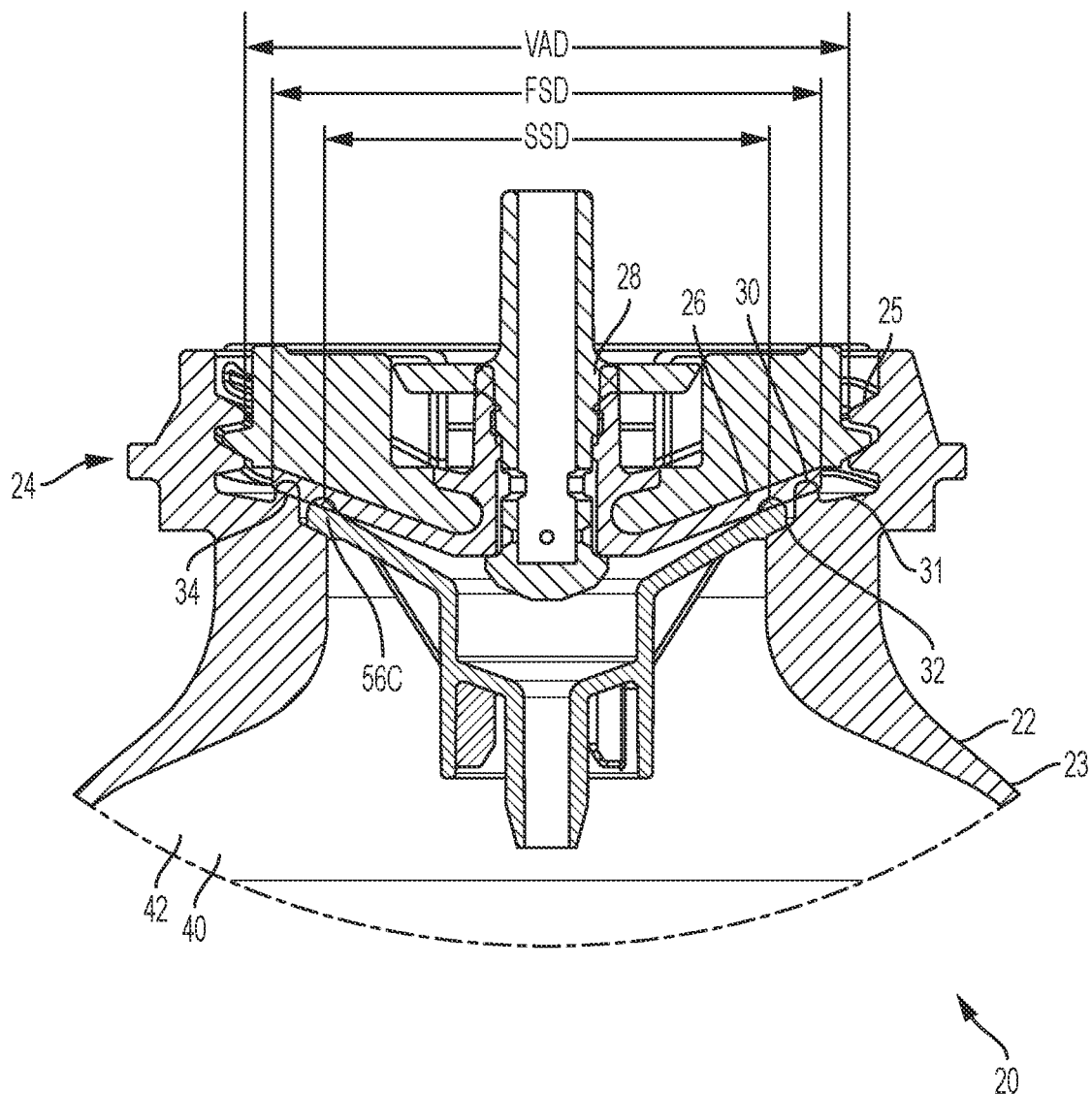
FIG. 5B is an enlarged fragmentary sectional view of the embodiment of FIG. 5A, and showing the outer container preform in its blow molded state, omitting the dip tube for clarity.
Figure 5C:
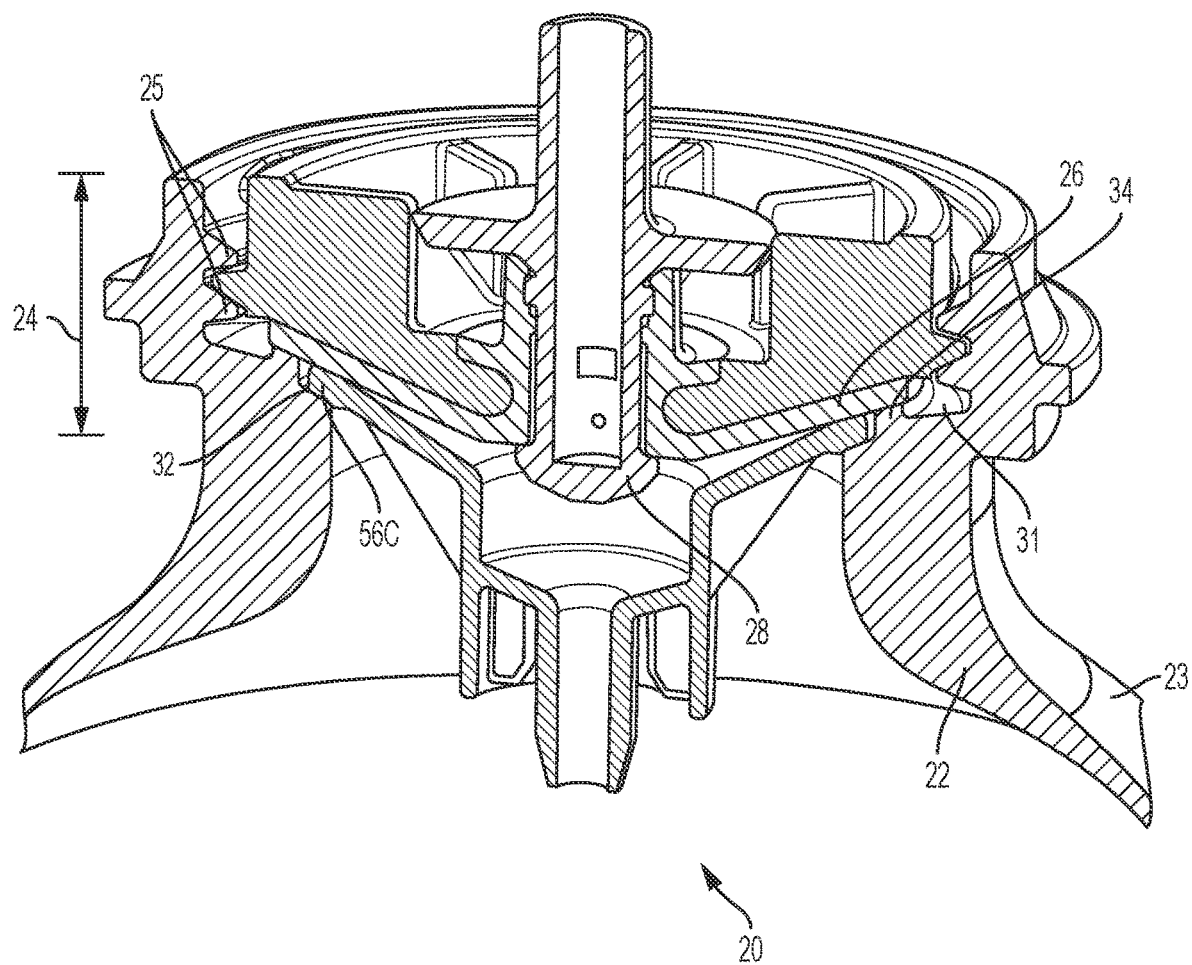
FIG. 5C is an enlarged fragmentary perspective view of the embodiment of FIG. 5B, and showing the outer container preform in its blow molded state, omitting the dip tube for clarity.

Referring to FIGS. 3A and 5A, a preform 60 may be used to make the outer container 22 or a bag 55 for use with the aerosol dispenser 20 of this invention. One of skill will recognize a bag 55 is commonly used to contain product 42 and keep such product 42 isolated from the propellant 40.

Thus, the aerosol dispenser 20 may be made by providing nested preforms 60 comprising an outer preform 60 and inner preform 60 disposed therein. The inner preform 60 has a valve cup 26 at the open end thereof.

The preforms 60 are blowmolded together to form an outer container 22 and having an open end and an inner bag 55 depending therefrom towards the closed end of the outer container. Propellant 40 is charged between the bag 55 and outer container 22. The valve cup 26 is sealing joined to the open end of the outer container 22 to contain the propellant 40 therein and form an aerosol container. The aerosol container may then be stored as needed or directly shipped for product 42 fill, installing the valve 28, actuator 29, label, etc.

Alternatively, an integral inner bag 55/valve cup 26 combination may be provided and inserted into an outer container 22. The inner bag 55 is inserted in the open end of the outer container 22. Propellant 40 is charged between the bag 55 and outer container 22. The integral valve cup 26 is sealingly joined to the open end of the outer container 22 to contain the propellant 40 therein and form an aerosol container. The aerosol container may then be stored as needed or directly shipped for product 42 fill, installing the valve 28, actuator 29, label, etc. In either alternative, the inner preform 60 may have a neck 24 according to the present invention, with the first sealing surface 31 and second sealing surface 32 as described and claimed herein.

While a round outer container 22 is described, the invention is not so limited. The outer container 22, and thus the valve attachment, first sealing surface 31 and second sealing surface 32 may be of any desired shape so long as the circumference of the second sealing surface 32 is less than and interior to the circumference of the first sealing surface 31 which in turn is less than and interior to the circumference of the valve attachment circumference. Preferably the valve attachment circumference, first sealing surface 31 circumference and second sealing surface 32 circumference are concentric.

In one embodiment, one of skill will recognize that a single outer container 22 may be used with $n_1$ different valves, properly sized to the valve attachment diameter VAD, with $n_2$ bags 55 and with $n_3$ dip tubes 56. This embodiment provides multiple formats, and $n_1 \times n_2 \times n_3$ different combinations of formats which may be advantageously used with a single outer container 22. Thus a single outer container 22 provides a chassis for $n_1 \times n_2 \times n_3$ different aerosol dispensers 20. Manufacturing complexity is reduced and flexibility increased using the present invention.

Thus a suitable embodiment is to use a single outer container 22 with any number of desired valves 28. Regarding the valve 28, it is only necessary that each valve 28 fit into the first sealing surface 31 and functionally dispense the product 42. Likewise regarding the product delivery device 55, 56, it is simply necessary that each product delivery device 55, 56 fit into the second sealing surface 32 and functionally dispense the product 42. Thus a bag 55 need only have a collar 55C and a dip tube 56 need only have a dip tube collar 56C which sealingly fits onto the second sealing surface 32. Of course, the product delivery device 55, 56 and valve 28 should not interfere with each other during assembly and use.

The invention comprises various embodiments and combinations, as set forth below in exemplary, non-limiting manner. It is to be understood that any of the variations, and combinations listed in each of the embodiments for the outer container 22, aerosol dispenser 20 and/or preform 60 may be used for any other such embodiment without limitation.

A. In one embodiment the invention comprises an outer container 22 having a longitudinal axis and being usable for a pressurized aerosol dispenser 20, said outer container 22 comprising:

a closed end bottom and an open neck 24 longitudinally opposed thereto, said open neck 24 having a valve 28 attachment having a valve attachment diameter VAD, a first surface 31 disposed below said valve attachment and having a first surface diameter FSD less than said valve attachment diameter VAD, and a second surface 32 disposed interior to said first surface 31 and having a second surface diameter SSD less than said first surface diameter FSD, a transition 34 distinguishing said first surface 31 from said second surface 32, whereby a product 42 delivery device 55, 56 complementary to said second surface 32 can be disposed thereon and not interfere with a valve 28 operable by a user when a said valve 28 is attached to said valve attachment in engagement with said first surface 31, at least one of said first surface 31 and said second surface 32 being a sealing surface to prevent escape of propellant 40 from said outer container 22 to ambient when a valve 28 is attached to said valve attachment.

B. An outer container 22 according to paragraph A wherein said valve attachment comprises internal threads 25.

C. An outer container 22 according to paragraphs A and B wherein said first surface 31 forms a funnel shape, said funnel shape sloping downwardly towards said longitudinal axis.

D. An outer container 22 according to paragraphs A, B and C wherein said second surface 32 is generally non-coplanar with said first surface 31.

E. An outer container 22 according to paragraphs A, B, C and D wherein said valve attachment, first surface 31 and said second surface 32 are integral with each other.

F. An outer container 22 according to paragraphs A, B, C, D and E, wherein said valve attachment, first surface 31 and said second surface 32 are integral with each other, and wherein said product delivery device 55, 56 comprises a dip tube 56, said dip tube 56 being sealingly engaged with said second surface 32.

G. An outer container 22 according to paragraphs A, B, C, D, E and F, wherein said valve attachment, first surface 31 and said second surface 32 are integral with each other, and wherein said product delivery device 55, 56 comprises a bag 55, said bag 55 being sealingly engaged with said second surface 32, said valve 28 being sealingly engaged with said first surface 31.

H. An outer container 22 according to paragraphs A, B, C, D, E, F and G wherein said valve attachment, first surface 31 and said second surface 32 are integral with each other and further comprising an annular seal bead 30 between said first surface 31 and said second surface 32.

I. In one embodiment the invention comprises an aerosol dispenser 20 having a longitudinal axis and comprising:

an outer container 22 comprising a closed end bottom and an open neck 24 longitudinally opposed thereto, said open neck 24 having a valve attachment having a valve attachment diameter VAD, a first surface 31 disposed below said valve attachment and having a first surface diameter FSD less than said valve attachment diameter VAD, a second surface 32 disposed interior to said first surface 31 and having a second surface diameter SSD less than said first surface diameter FSD, whereby a product delivery device 55, 56 complementary to said second surface 32 can be disposed thereon and not longitudinally interfere with a valve 28 attached to said valve attachment;

a valve 28 attached to said valve attachment and being operable to dispense product 42 from the aerosol dispenser 20, said valve 28 being sealed against one of said first surface 31 and said second surface 32;

a product delivery device 55, 56 disposed within said outer container 22 and substantially disposed below said valve 28, said product delivery device 55, 56 being sealed to one of said second first surface 31 and said second surface 32 and being in fluid communication with said valve 28, one of said first surface 31 and said second surface 32 being a sealing surface to sealingly prevent escape of propellant 40 from said outer container 22 to ambient or to said product delivery device 55, 56 when a valve 28 is attached to said valve attachment; and an actuator 29 operably connected to said valve 28 for selectively dispensing product 42 from said aerosol dispenser 20 upon demand J. An aerosol dispenser 20 according to paragraph I wherein said product delivery device 55, 56 comprises a bag 55.

K. An aerosol dispenser 20 according to paragraphs I and J wherein said first surface 31 and said second surface 32 are contiguous.

L. An aerosol dispenser 20 to paragraphs I, J and K wherein said first surface 31 and said second surface 32 are contiguous and form a frustrum of a cone.

M. An aerosol dispenser 20 according to paragraphs I, K and L wherein said product delivery device 55, 56 comprises a dip tube 56.

N. An aerosol dispenser 20 according to paragraphs I, J, K, L and M consisting essentially of Resin Identification Code 1/01.

O. In one embodiment the invention comprises a preform 60 having a longitudinal axis and being usable, upon blow molding, as an outer container 22 for a pressurized aerosol dispenser 20, said preform 60 comprising:
a closed end bottom and an open neck 24 longitudinally opposed thereto, said open neck 24 having
a valve attachment having a valve attachment diameter VAD,
a first surface 31 disposed below said valve attachment and having a first surface diameter FSD less than said valve attachment diameter VAD,
a second surface 32 disposed below said first surface 31 and having a second surface diameter SSD less than said first surface diameter FSD, one of said first surface 31 and said second surface 32 being a sealing surface to prevent escape of propellant 40 from said outer container 22 to ambient or to said product delivery device 55, 56 when a valve 28 is attached to said valve attachment,
a transition 34 distinguishing said first surface 31 from said second surface 32,
whereby a component complementary to said second surface 32 can be disposed thereon and not interfere with a valve 28 operable by a user when said valve is attached to said valve attachment.

P. A preform 60 according to paragraph O wherein said first surface 31 and said second surface 32 are rectilinear and form an obtuse angle therebetween.

Q. A preform 60 according to paragraphs O and P wherein said first surface 31 and said second surface 32 form an obtuse angle therebetween, one of said first surface 31 and said second surface 32 being generally perpendicular to said longitudinal axis.

R. A preform 60 according to paragraphs O, P and Q further comprising an annular seal bead 30 disposed between and demarking said first surface 31 and said second surface 32.

S. A preform 60 according to paragraphs O, Q and R wherein at least one of said first surface 31 and said second surface 32 is generally concave or convex.

T. A preform 60 according to paragraphs O, Q, R and S wherein one of said first surface 31 and said second surface 32 is generally concave to receive a seal 30 therein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An outer container having a longitudinal axis and being usable for a pressurized aerosol dispenser, the outer container is polymeric and it comprises:
    a closed end bottom and an open neck longitudinally opposed thereto, the open neck comprising:
    a first surface, which is polymeric, having a first surface diameter wherein the first surface forms a funnel shape, the funnel shape sloping downwardly towards the longitudinal axis;
    a second surface, which is polymeric, disposed interior to the first surface and having a second surface diameter less than the first surface diameter; and
    a transition distinguishing the first surface from the second surface,
    wherein a product delivery device, which is polymeric, complementary to the second surface is disposed on the second surface and is operable by a user when a valve is attached to the open neck in engagement with the first surface, at least one of the first surface and the second surface being a sealing surface to prevent escape of propellant from the outer container to ambient when a valve is attached to the first surface, wherein a weld is present between the valve and at least one of the first surface and the second surface; and
    wherein the polymeric product delivery device comprises a polymeric dip tube, the polymeric dip tube being sealingly engaged with the polymeric second surface and there is no bag present.

2. The outer container of claim 1, wherein the second surface is non-coplanar with the first surface.

3. The outer container of claim 1, wherein the first surface and the second surface are integral with each other.

4. The outer container of claim 1, wherein the product delivery device comprises a bag, the bag being sealingly engaged with the second surface, the valve being sealingly engaged with the first surface.

5. The outer container of claim 1, wherein a weld is present between the valve and the first surface.

* * * * *